Sept. 14, 1954  J. ROTHBAUM  2,688,809
NECKTIE SAMPLER

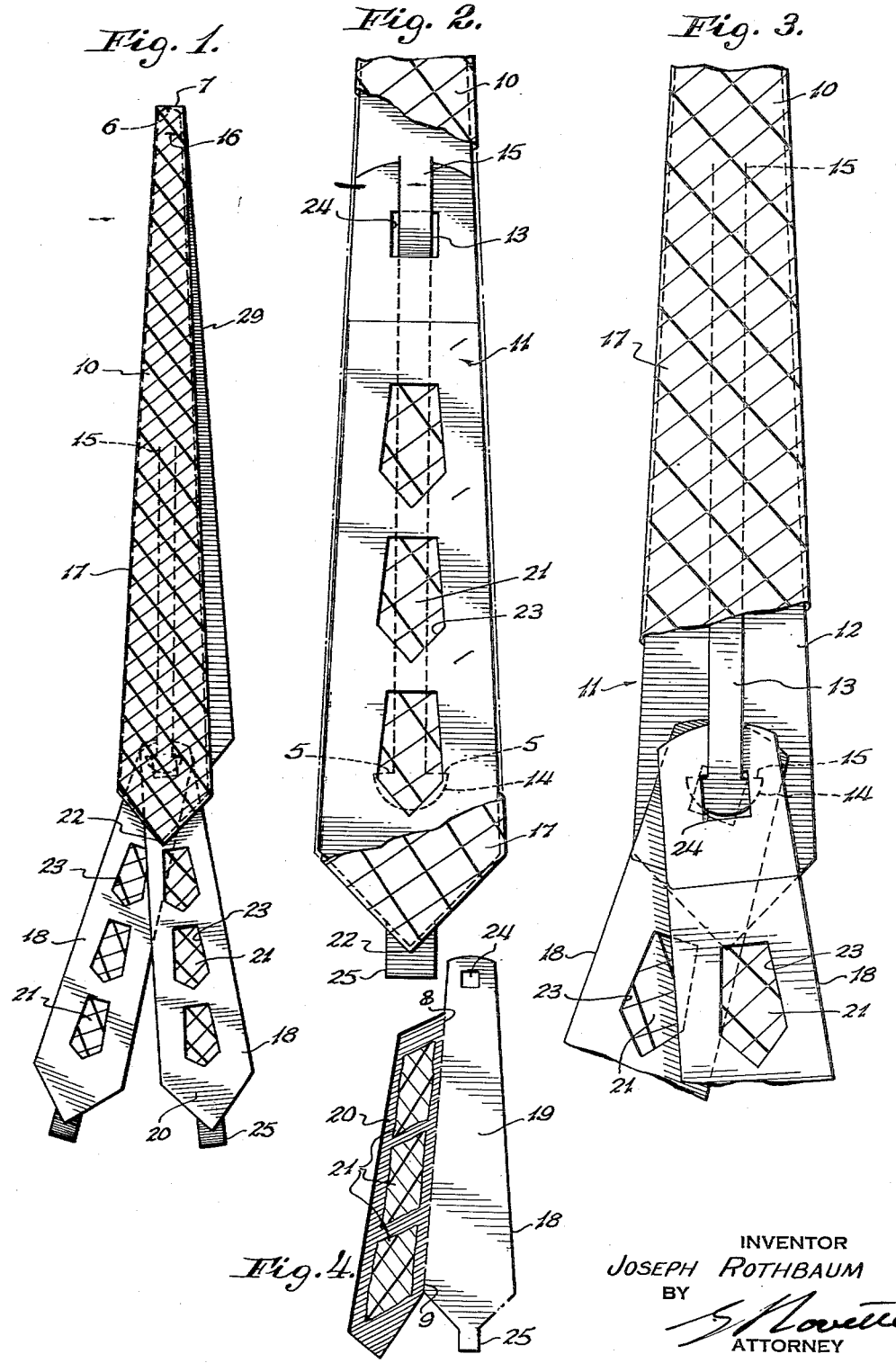

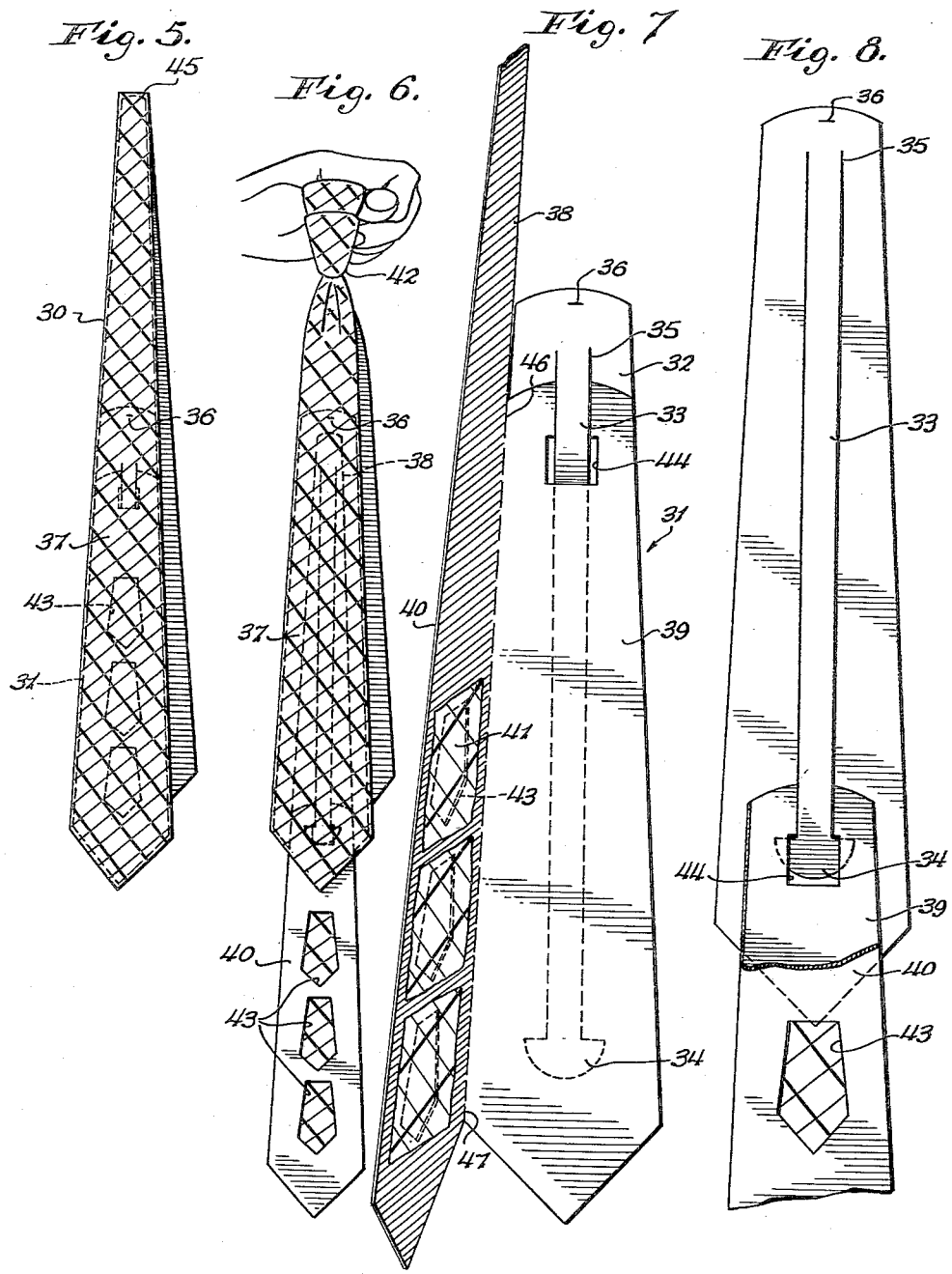

Filed Aug. 22, 1952  3 Sheets-Sheet 3

INVENTOR
JOSEPH ROTHBAUM
BY
ATTORNEY

Patented Sept. 14, 1954

2,688,809

UNITED STATES PATENT OFFICE 2,688,809

NECKTIE SAMPLER

Joseph Rothbaum, Brooklyn, N. Y., assignor of one-half to Fred Locks, New York, N. Y.

Application August 22, 1952, Serial No. 305,877

10 Claims. (Cl. 35—50)

This invention relates to a necktie display sampler. The necktie industry is highly competitive. The success of a necktie manufacturer depends upon the quality of his product and upon his ability to advertise and display his new designs for the oncoming season. The matter of advertising and displaying new necktie designs before the buyers of large and small retail outlets is of the utmost importance. A failure here would nullify the effectiveness of quality of the product.

There are four seasons in the neckwear industry; summer, fall, winter and spring. There isn't enough time for the retail buyers to develop a liking for the new designs the manufacturer is promoting. Decisions to buy a manufacturer's neckwear must be made quickly so that production can meet the seasonal demand. Very often first impressions of new designs become a controlling factor.

As a result, each necktie manufacturer must pour many thousands of dollars in form of time, material and labor into the seasonal displays held throughout the country if he is to continue in business. The effectiveness of his display will spell out success or failure for the oncoming season.

The demands of seasonal displays are great. The manufacturer must promote new designs for each season. He must model his new designs by making neckties for display. Furthermore, each design must be duplicated in various color combinations. For example, to create an effective display of a polka dot necktie, the manufacturer will provide his salesman and show rooms with models in blue and white, another in brown and gray, another in maroon and yellow, and so on. These models are not made in large quantities; hence the costs of the models are relatively high. It has been the practice of the manufacturer to discard the models at the conclusion of the display. In the past the models were damaged by permanent creases and folds and so rumpled that they were beyond repair and resale. As a result, the manufacturer found it impossible to recoup even a small part of the cost of the models. This item by itself represents thousands of dollars allocated to advertising.

The instant invention overcomes this costly feature that has been plaguing the necktie industry.

The invention provides a necktie display sampler, i. e., a form upon which the models are fitted for the display. The novel features of the invention permit the form to fit the necktie so that during display, the necktie maintains its shape. Permanent creases along the apron of the necktie are eliminated by the use of the invention. Its use also ensures that the model at all times will remain fresh looking and unrumpled. After modelling the necktie, the manufacturer may now sell the tie because it is no longer a damaged article. Thus, a great portion of the cost of necktie models may be recouped by the use of the invention.

Another advantage of the invention lies in the fact that it now eliminates the former requirement of a number of neckties of different color combinations for each design. The instant invention permits one model and a large number of swatches of the design of the necktie model to be displayed simultaneously. This eliminates the heavy costs and the cumbersome features attending displaying multitudinous necktie models which was the common practice in the past.

If the manufacturer desires, he may discard the sampler after its use. A further advantage of the invention is that it is very economical to make and to assemble with a necktie model and swatches. In spite of the fact that the necktie sampler and swatches are discarded, the manufacturer still realizes vast savings of costs incurred by reason of displaying models. However, it is not necessary that the sampler be discarded. It may be used again for the next season's display.

It is therefore the principal object of this invention to provide a necktie display sampler which would protect the necktie on display against permanent damage so that it may be sold after it is used for display purposes.

A further object of this invention is to provide for an economical necktie display sampler so that its costs are small enough to warrant discarding it after use.

A further object of this invention is to provide a convenient means of displaying a necktie of a particular design simultaneously with swatches illustrating various different color combinations of the same design to eliminate the past practice of displaying a necktie for each color combination and thereby avoiding the costly and cumbersome features attending the necktie display practices of the past.

Other objects and advantages will become apparent from the specification wherein the invention is described in detail taken in connection with the accompanying drawings.

Fig. 1 is a perspective view of one embodiment of a necktie sampler carrying a necktie model for display;

Fig. 2, partly in cross section, illustrates the swatch insert;

Fig. 3 is a longitudinal view, partly in section, of the embodiment of Fig. 1;

Fig. 4 is a perspective view of the swatch insert;

Fig. 5 illustrates a second embodiment of a necktie sampler;

Fig. 6 is a perspective view of the latter embodiment showing a knotted model on display;

Fig. 7 is a perspective view of the swatch insert of latter embodiment;

Fig. 8 is a longitudinal view, partly in section, of the latter embodiment;

Figure 9:
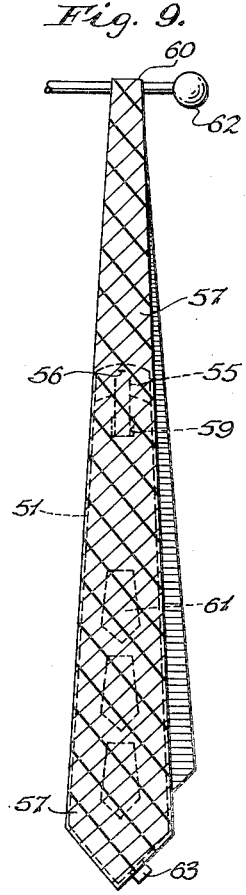
Figure 10:
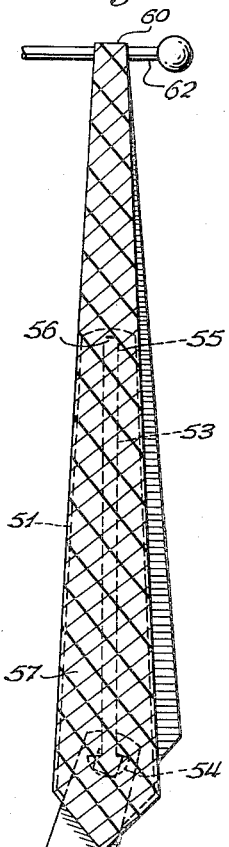
Figure 11:
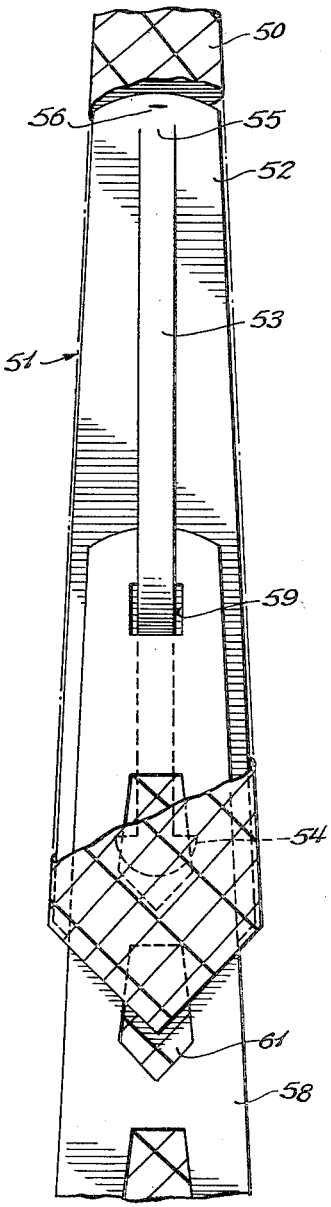

Fig. 9 discloses a third embodiment of the invention;

Fig. 10 is a perspective view of the third embodiment;

Fig. 11 is a longitudinal view partly in section of third embodiment; and

Figure 12:
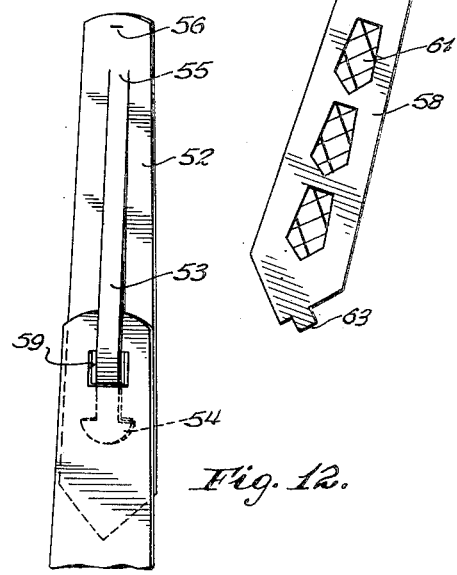

Fig. 12 is a perspective view of a supporting member.

The necktie sampler is predeterminedly designed to fit into the inner folds of the necktie model to be displayed. The necktie sampler may be readily manufactured by die-stamping semistiff cardboard paper. Reference to Figures 1 through 4 will illustrate one embodiment of the invention. For purpose of explanation, the apron or skirt 17 shall be defined as the front-exposed portion of a necktie 10. Apron 17 starts at apron point 22 and extends upward to the centerfold 7. The centerfold is the half way point along the length of a necktie.

The necktie sampler 11 is shown within the apron folds of necktie 10. Sampler 11 is made up of two major components: a rear supporting member 12 and a swatch insert 18.

Supporting member 12 is predeterminedly shaped to conform with apron 17 of necktie 10. When inserted into the apron folds, supporting member 12 provides a firm support for apron 17. Thus, apron 17 is at all times maintained in a smooth and fresh-looking shape. Supporting member 12 is fastened at some convenient point, such as 16, to necktie 10. Fastening may be accomplished by thread or staple. The upper end 6 of supporting member 12 is rounded off to facilitate insertion of member 12 in the apron folds of necktie 10.

The length of supporting member 12 is shown approximately equal to the length of apron 17. This protects the full length of apron 17 against permanent creases. If less apron length is desired to be supported, supporting member 12 may be made correspondingly shorter by terminating it below centerfold 7. The length of supporting member 12 may be chosen to satisfy the convenience of the person displaying the necktie.

A guide or track 13 extends at its upper end 15 from supporting member 12. A stop 14 terminates the other end of guide 13. In the instant embodiment, guide 13 is a cut-out of supporting member 12, with upper end 15 as the uncut connecting end. Stop 14 need not be confined to the semicircular shape as shown. The horizontal edge 5 of stop 14 should be sufficiently wide to prevent insert 18 from freely leaving guide 13. Guide 13 should be of sufficient and convenient width to support numerous passages of insert 18 therealong.

Supporting member 12 is made of a semi-stiff cardboard paper so that necktie model 10 mounted thereon is at all times maintained in a smooth and fresh-looking shape.

With reference to Figure 4, it is seen that insert 18 consists of a back portion 19 and a face portion 20. In the instant embodiment, insert 18 is of one piece of cardboard with portions 19 and 20 distinguished by the fold-axis 8—9. A series of swatches 21 are fastened to the under surface of face portion 20 with each swatch opposite a correlated window 23. Although not shown, the swatches may be fastened to the upper surface of back portion 19; each swatch would be positioned along portion 19 so that it is seen through a correlated window when insert 18 is folded along axis 8—9. The aperture 24 at the upper end of insert 18 is adapted to engage guide 13. The horizontal dimension of aperture 24 is slightly narrower than edge 5, but wider than the width of guide 13 to permit free and easy movement of insert 18 along guide 13.

The length of insert 18 is not critical. In the instant embodiment, insert 18 is made long enough to carry three large swatches 21. The shape of insert 18 is made to conform with the corresponding lower portion of apron 17. The length of guide 13 and the distance its upper end 15 is spaced from the apron point 22 are determined by the length of insert 18 exposed to view to effect full display of swatches 21.

Insert 18 is folded along axis 8—9 to superimpose face portion 20 upon back portion 19. Thus, the swatches 21 are exposed to view through windows 23. The edges of face and back portions 20, 19 opposite the fold axis 8—9 are fastened preferably by staple. Guide 13 is passed through aperture 24 by working stop 14 therethrough. By gently pulling down on tab 25 and gently pushing up thereon, insert 18 may be withdrawn from and returned within the apron folds of necktie 10.

Necktie sampler 11 may be easily removed from necktie 10 by breaking the fastening means at 16. When removed, the necktie need not be discarded because its shape has been retained by sampler 11. Necktie 10 may be supported by the person displaying same by placing his finger under centerfold 7. A rack or bar (Figure 10) at the same place would serve equally as well.

In the instant embodiment, more than one insert may be coupled to necktie sampler 10. This allows the display of more swatches. Figures 1 and 3 illustrate two inserts 18, 18 coupled to guide 13, one on top of the other. Each insert 18 may be operated independently.

Occasionally, the person displaying the necktie desires to show the necktie knotted while displaying the model. This requires that the upper end of the apron of the necktie near the centerfold be free of the necktie sampler to allow room for a knot as shown in Figure 6. The embodiment illustrated in Figs. 5 through 8 inclusive illustrates a modification of the invention which would permit a knot at the centerfold.

A necktie 30 is shown mounted on the necktie sampler 31. Necktie sampler 31 consists of two major components; a supporting member 32 and swatch insert 38. In this embodiment, supporting member 32 does not extend the full length of the apron 37 of necktie 30. Member 32 terminates at some convenient distance short of the centerfold 45 to allow room for a knot 42.

Supporting number 32 is tacked to necktie 30 at 36. A guide 33 extends from supporting member 32 at 35 and terminates at its lower end with a stop 34. Swatch insert 38 has a back portion 39 and a face portion 40 divided by fold axis 46—47. Swatches 41 are fastened to the under surface of face portion 40 adjacent correlated swatch windows 43. Insert 38 is folded along axis 46—47 with face portion 40 superimposed on back portion 39. The free edges of portions 39, 40 opposite axis 46—47 are fastened, for example, by staple, so that insert 38 remains flat.

In this embodiment, the face portion 40 of swatch insert 38 is made as long as apron 37 of necktie 30. Aperture 44 at the uper end of back portion 39 engages guide 33 to permit movement of insert 38 along guide 33.

This embodiment provides a full length firm support for apron 37 when the insert is not pulled down to display swatches 41. When insert 38 is pulled down, the upper end of face portion 40 is drawn downward and away from centerfold 45 a corresponding distance, leaving enough room near centerfold 45 to make knot 42.

A third embodiment, Figures 9 through 11 inclusive, is suggested for neckties of smooth and light material. In some instances the material of the necktie 50 does not provide enough friction to keep necktie 50 on the display rod 62. The additional weight of the necktie sampler 51 may cause necktie 50 to slide off rod 62 when it is attempted to hang necktie 50 at its centerfold 60. With the purpose of decreasing the weight of necktie sampler 51 so that necktie 50 may be attractively displayed as illustrated in Fig. 10, the instant embodiment may be used.

Necktie sampler 51 is shown with its two major components: supporting member 52 and swatch insert 58. Neither component extends the full length of apron 57 of necktie 50. Supporting member 52 is fastened at 56 to necktie 50. Guide 53 at 55 extends from supporting member 52 and terminates at a stop 54. Insert 58 is simplified by making it of an unfolded single face thereby eliminating further weight. The cardboard for this embodiment should be chosen of a relatively light paper to decrease further the weight of necktie sampler 51. Swatches 61 are mounted directly on the upper surface of insert 58. Guide coupling means 59 at the upper end of insert 58 engages guide 53 to permit the display of swatches 61 when insert 58 is drawn downwardly from the apron folds of necktie 50 by a gentle pull on tab 63.

Although not shown, it should be clear that the guide and the guide coupling means may be interchanged, for example, the guide may be made as a cutout of the insert. When this is done, the guide coupling means is located on the supporting member.

Furthermore, the single surface insert of the third embodiment may be used equally as well in place of the inserts disclosed in the prior embodiments.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A necktie sampler comprising a supporting member having a longitudinal dimension substantially greater than its transverse dimension, a guide fastened at one end thereof to said supporting member and extending therefrom in the direction of the longitudinal axis of said member toward the furthest end thereof, a pair of edges extending transversely from said guide at its other end to form a stop surface thereat, a swatch insert having a face portion and a back portion with said face portion superimposed upon said back portion, swatch windows spaced along said face portion, a plurality of swatches held between said portions and spaced therealong with each swatch located adjacent a correlated window, and guide engaging means on said insert through which said guide is slidably coupled to permit movement of said insert along said guide, said means comprising a window having a transverse dimension greater than the width of said guide and less than the combined transverse dimensions of said guide and stop surface, whereby said insert is translatable along said guide but disengagement therefrom is impeded by said stop surface.

2. A necktie sampler as described in claim 1 having a plurality of swatch inserts each separately coupled to said guide by respective guide engaging means.

3. A necktie sampler as described in claim 1 in combination with a necktie mounted thereon, said supporting member being held within the apron folds of said necktie by fastening means.

4. A necktie sampler as described in claim 1 wherein said supporting member having a contour substantially coinciding with the contour of the apron of the necktie to be mounted on said sampler.

5. A necktie sampler as described in claim 1 wherein said face portion having a contour substantially coinciding with the contour of the apron of the necktie to be mounted on said sampler.

6. A necktie sampler comprising a supporting member, a guide fastened at one end to said supporting member and extending from said end toward the end of said supporting member far removed from the place of fastening, a stop surface extending laterally out from the other end of said guide, a swatch insert, guide engaging means on said insert adapted to receive therethrough said guide in slidable engagement, said means comprising a window having a transverse dimension greater than the width of said guide to permit movement of said insert therealong, said transverse dimension being less than the combined width of said guide and said stop surface whereby disengagement of said insert from said guide is impeded.

7. A necktie sampler comprising a supporting member having a longitudinal dimension greater than its transverse dimension, a guide fastened at one end thereof to said supporting member and extending in the direction of the longitudinal axis thereof toward the other end of said member, a stop surface at the unfastened end of said guide, extending transversely therefrom, a swatch insert, a plurality of swatches mounted on and spaced along said insert, and guide engaging means on said insert and slidably coupled to said guide to permit movement of said insert along said guide, said means comprising a window having a transverse dimension greater than said guide and less than the combined dimensions of said guide and stop surface, whereby disengagement between said means and said guide is impeded by said stop surface.

8. A necktie sampler as described in claim 7 wherein said sampler is made of semi-stiff cardboard paper.

9. A necktie sampler comprising a supporting member having a longitudinal dimension greater than its transverse dimension, a swatch carrying member having a longitudinal axis, a guide having one end thereof fastened to one of said aforementioned members, said guide extending in the direction of the longitudinal axis of said member to which it is attached, a stop surface extending transversely from said guide at its unfastened end thereof, and a guide engaging window on the other of said aforementioned members and adapted to receive said guide therethrough in slidable engagement, said window having a transverse dimension greater than the width of said guide and less than the combined width of said stop surface and guide whereby disengagement of said guide from said window is impeded.

10. A necktie sampler as described in claim 9, wherein the stop surface comprises at least one transversely extending edge.

References Cited in the file of this patent

UNITED STATES PATENTS

| Number | Name | Date |
| --- | --- | --- |
| Re. 21,845 | Weinlich | June 24, 1941 |
| 1,644,963 | Ulich | Oct. 11, 1927 |
| 1,901,941 | York | Mar. 21, 1933 |
| 2,581,101 | Hirsch | Jan. 1, 1952 |
| 2,618,378 | Miller | Nov. 18, 1952 |

FOREIGN PATENTS

| Number | Country | Date |
| --- | --- | --- |
| 33,675 | Switzerland | May 3, 1905 |
| 390,258 | Great Britain | Apr. 6, 1933 |